UNITED STATES PATENT OFFICE.

GEORGE J. L. JANES, OF CHICAGO, ILLINOIS.

BEVERAGE COMPOUND.

SPECIFICATION forming part of Letters Patent No. 607,173, dated July 12, 1898.

Application filed June 16, 1897. Serial No. 640,962. (No specimens.)

*To all whom it may concern:*

Be it known that I, GEORGE J. L. JANES, a citizen of the United States, residing at Chicago, in the county of Cook and State of Illinois, have invented and produced a new and useful Compound from which to Make a Beverage, of which the following is a specification.

In the process of manufacturing chocolate or cocoa the seeds or beans of the cacao are roasted and their shells removed. Because of the medicinal properties of the shells a limited use is made of them in the preparation of a beverage for invalids and children; but because of its peculiar flavor and want of richness it has never become popular. This beverage is in the nature of a tea, which is made by boiling the shells in water. The demand for these shells of the cacao-seed is so limited that they are almost without value, and they are usually either thrown away or used for fuel. I have discovered that by properly treating them and mixing with them a percentage of the roasted kernel of the cacao-seed the result is a mixture or compound from which I may make a beverage which possesses all of the beneficial medicinal properties of the tea, which is made by steeping the shells in water and which in addition has the flavor and some of the richness of cocoa.

In the manufacture of chocolate the whole of the kernel, (minus the germ,) but none of the shell, of the cacao-seed is used. The seed is first roasted and then shelled. The kernel is then ground, and by reason of the fact that it is more than fifty per cent. oil the result is a paste, which, when sweetened and flavored, if desired, is the chocolate of commerce. The cocoa extract of commerce does not differ from chocolate, excepting that a large proportion of the oil is extracted.

In making a beverage of either chocolate or cocoa of commerce the chocolate or cocoa is simply mixed with water, so that all of its constituent parts enter into and form a part of the beverage. Chocolate thus prepared is too rich for many people, and it is the cocoa that supplies the demand for a beverage of the same general character which is not so rich; but it is true of the beverage made in this way from either chocolate or cocoa that all of its constituent parts are taken into the stomach.

The object of my present invention is to provide a material from which to make a beverage which does not possess the richness of chocolate or cocoa, which does possess the valuable medicinal properties of tea made by boiling the shells, as above described, while at the same time it does not possess the same unpleasant flavor, which is healthful and nourishing and which is inexpensive. To these ends I make a mixture or compound consisting of the ground shells of the cacao-seed, finely-divided or granulated cacao-seed, and, if desired, a ground cereal, although this latter may be omitted, if desired.

To prepare this compound, the cacao-seed is first roasted and then shelled. The shell is then ground, (not pulverized,) the object of the grinding being to subdivide it into small flakes or granules in order to permit a more intimate contact of its particles with the water that is used in preparing the beverage. The kernel is also granulated or subdivided into small pieces; but owing to the large percentage of oil which is present in it this subdivision is preferably accomplished by chopping it. Where a cereal is used, barley is preferred, although wheat, rye, and some others may be used. The cereal is roasted and ground, not to a powder, but simply to small pieces or granules. These ingredients are preferably used in the following proportions: ground shells of cacao-seed, seventy per cent.; chopped kernel of cacao-seed, twenty per cent.; ground cereal, five per cent. I desire to have it understood, however, that these proportions may be departed from and that the cereal may be omitted without departing from the spirit of my invention, the principal feature of which consists in the compound containing the shells and kernel of the cacao-seed in granular form. The degree of the subdivision of these ingredients may be varied within certain limits; but I prefer such a degree of subdivision that the compound will be about of the consistency of ground coffee. There will inevitably be some powder of the materials used, as there is some powder in ground coffee even when it is coarsely ground; but the bulk of the material will have a granular or flaky consistency.

To make a beverage or tea from this compound, boiling water is poured upon it and it is boiled from three to five minutes. Preferably it is made in a drip-coffee pot, and it should be strained before using. This beverage differs from chocolate and cocoa, prepared as above described, in that it contains only such of the constituents of the compound as are dissolved or boiled out, and instead of having a muddy appearance it is clear and of a rich color. As a consequence of its having none of the woody part of the seed it is more digestible and more healthful than either chocolate or cocoa.

Aside from the production of a delicious beverage of great merit my invention enables me to utilize and thereby make valuable the shells of the cacao-seed, which, as before stated, have heretofore amounted to but little more than a waste product.

Having thus described my invention, the following is what I claim as new therein and desire to secure by Letters Patent:

1. A compound for use in making beverages, the same consisting of the roasted shells of the cacao-bean reduced to flaky form, and mixed with a smaller proportion of the granulated kernel of the roasted bean; substantially as described.

2. A compound for use in making beverages, the same consisting of the roasted shells of the cacao-bean reduced to flaky form, a smaller proportion of roasted and granulated kernel of the bean, and a still smaller proportion of a roasted and granulated cereal, substantially as described.

GEORGE J. L. JANES.

Witnesses:
L. M. HOPKINS,
I. CROSS.